United States Patent [19]
Bruns

[11] 3,729,087
[45] Apr. 24, 1973

[54] ADJUSTABLE RETRACTABLE AUGER HOPPER

[76] Inventor: Wesley W. Bruns, Route 2, Box 184, Gibbon, Minn. 55335

[22] Filed: Feb. 17, 1972

[21] Appl. No.: 227,566

[52] U.S. Cl. ................198/122, 193/2 R, 193/2 C, 198/44, 198/64, 209/245, 209/257
[58] Field of Search.................198/64, 47, 98, 94, 198/99, 121, 122, 233, 44; 209/244, 245

[56] References Cited

UNITED STATES PATENTS 3,035,682  5/1962  French ................................198/64

Primary Examiner—Richard E. Aegerter
Assistant Examiner—Joseph E. Valenza
Attorney—Robert W. Gutenkauf et al.

[57] ABSTRACT

An auger hopper is usable with a screw flight auger to convey granular material, such as grain, from one depository station to another. The auger hopper has upwardly open bin means for temporarily holding the granular material as it is picked up by the auger. Adjustable inlet means are movably connected to the bin means and, in a normal configuration, releasably engage the bin means to close a front opening. The inlet means aids in guiding and deflecting granular material discharged from the first depository station to the hopper proper. Inlet means are movable inwardly to a position within the auger hopper proper to avoid damage as by collision when a truck is manipulated into discharge proximity of the hopper. Inlet means are movable outwardly of the auger hopper as to be out of the way when so desired.

5 Claims, 7 Drawing Figures

Patented April 24, 1973

Patented April 24, 1973
3,729,087
3 Sheets-Sheet 2
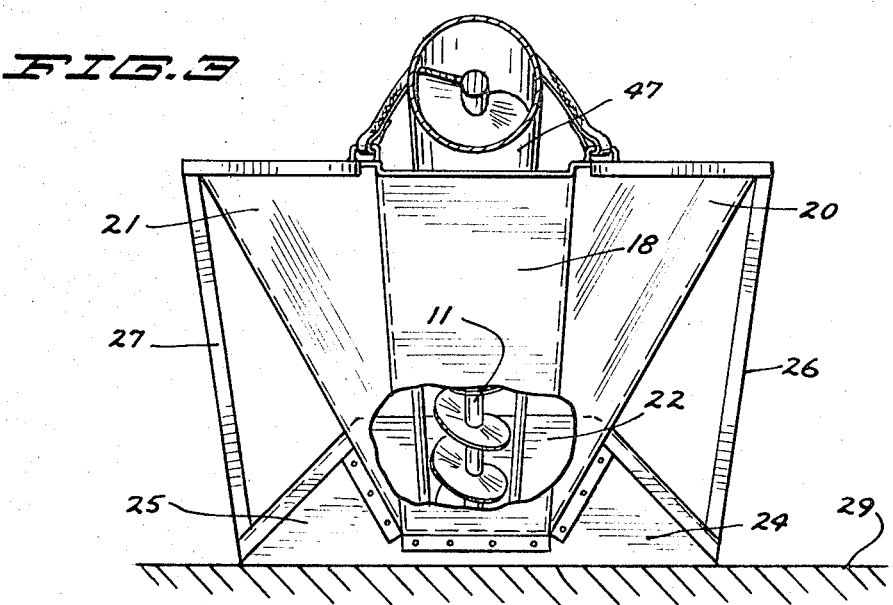
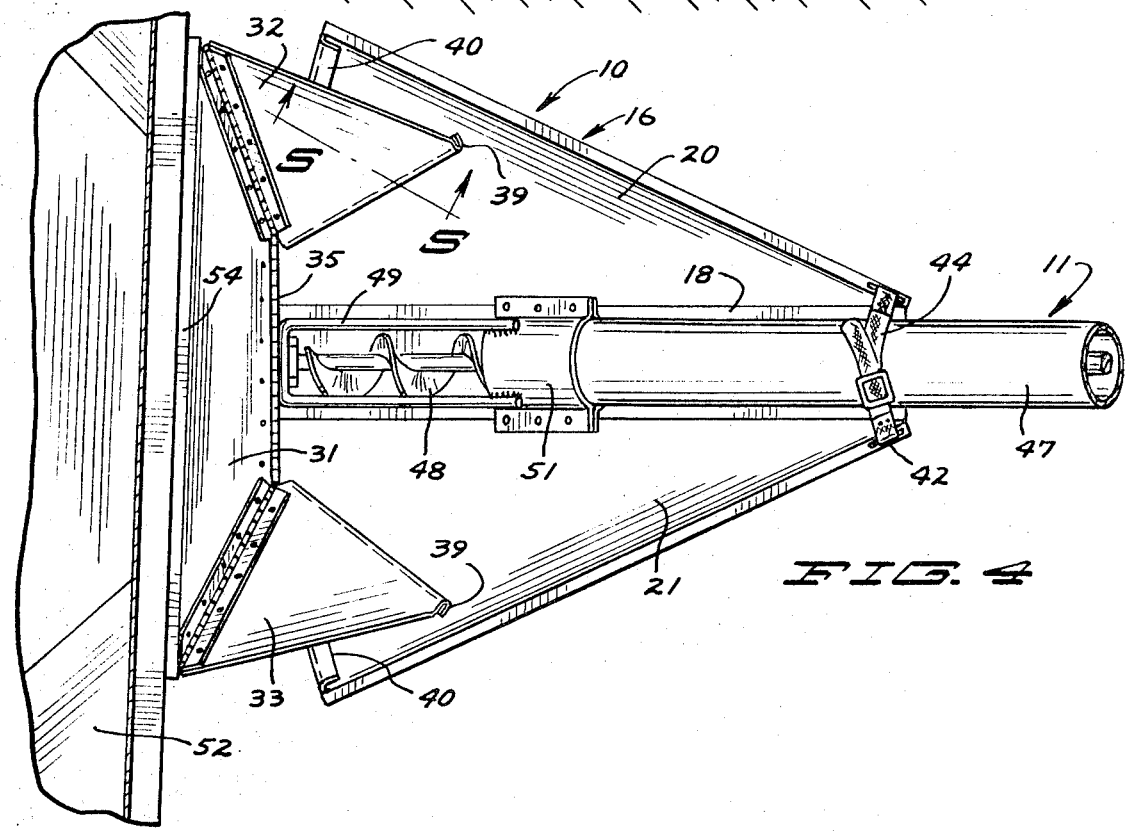
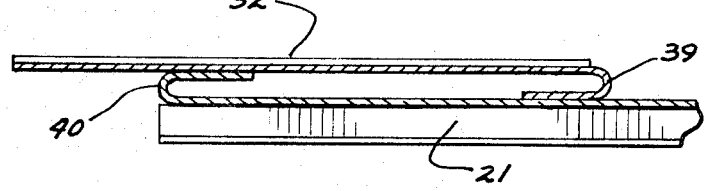

ADJUSTABLE RETRACTABLE AUGER HOPPER

BACKGROUND OF THE INVENTION

In the field of handling granular and other particulate materials, the use of screw flight auger conveyors is widespread for the conveyance and elevation of such materials from one depository or storage station to another. For example, the transfer of grain from a transport truck to a grain elevator. An auger hopper is employed to temporarily hold granular material being fed to the auger. The auger hopper typically has a wide mouth or inlet portion to deflect and guide material discharged from the first depository station to the auger hopper proper. An end of the auger is positioned in the hopper to draw material from it for conveyance to an inlet of the second depository station. The auger hopper inlet portion is particularly vulnerable to damage, as by collision. For example, if the granular material is to be conveyed from a transport truck or trailer to a stationary structure, as a grain elevator, the auger and hopper are usually first positioned relative to the building in generally perpendicular relationship to the side wall of the building. The truck is then manipulated into discharge position relative to the hopper. To minimize spillage and loss, it is desirable to position the truck closely adjacent the hopper whereby a discharge chute, if used, may be positioned directly over the hopper. Inevitably, during such manipulations the truck or trailer will strike and damage the hopper with its vulnerable wide mouth. Eventually the hopper must be repaired or replaced. Such collision and damage is also likely when the auger and hopper are manipulated into discharge position relative to a building, as when the granular material is to be transferred from a grain elevator to a transport truck.

In the prior art, there are provided auger hoppers to overcome this problem, having flexible portions which yield or deform upon the application of pressure, but resume a normal shape upon release of the pressure. For example, see U.S. Pat. No. 3,035,682 to Ferch and U.S. Pat. No. 3,203,532 to Mimnaugh et al. Such hoppers, lacking durability and strength, have enjoyed only limited success and are not in common use.

SUMMARY OF THE INVENTION

The invention relates to an improved auger hopper for temporarily storing granular or other particulate material being drawn and conveyed by a screw flight auger to a depository station. In particular, the auger hopper of the invention is provided with retractable, adjustable inlet means. The inlet means normally forms a wide, upwardly open inlet mouth similar to conventional auger hoppers of the prior art, whereby a minimum of granular material being discharged into the auger hopper is lost by spillage or the like. However, the inlet means is movably mounted to the auger hopper bin or storage portion, whereby the inlet means is retractable into the bin. During the relative positioning of the hopper and a discharge location of a depository station, such as a truck, the inlet means is placed in the retracted configuration. The prospect of damage to the hopper mouth, as by collision, is thus greatly reduced. The inlet means is also movable outwardly of the bin portion for situations where it is not desirable to employ a wide inlet mouth, as when the granular material is being sifted as it is discharged from a depository station. Additionally, the inlet means is adjustable to any desired intermediate position between the extreme outward position and the fully retracted position, being releasably fastenable in a normal in-between configuration.

An object of the invention is to provide an auger hopper having an adjustable inlet portion fixedly engageable in a normally open configuration. A second object of the invention is to provide an auger hopper having an inlet means retractable to reduce vulnerability to damage. A further object of the invention is to provide an auger hopper having an inlet portion movable to an out-of-the-way position relative to the remainder of the auger hopper. Further objects of the invention will become apparent upon the following description.

IN THE DRAWINGS

FIG. 3 is a rear elevational view of the auger hopper of the invention fastened to an auger, and taken on line 3—3 in FIG. 2;

FIG. 4 is a top plan view of the auger hopper of the invention having the inlet means in a partially retracted configuration resting on the side of a vehicle;

FIG. 5 is a sectional view showing fastening means of the inlet means, taken along the line 5—5 of FIG. 4;

DESCRIPTION OF PREFERRED EMBODIMENT

Figure 1:
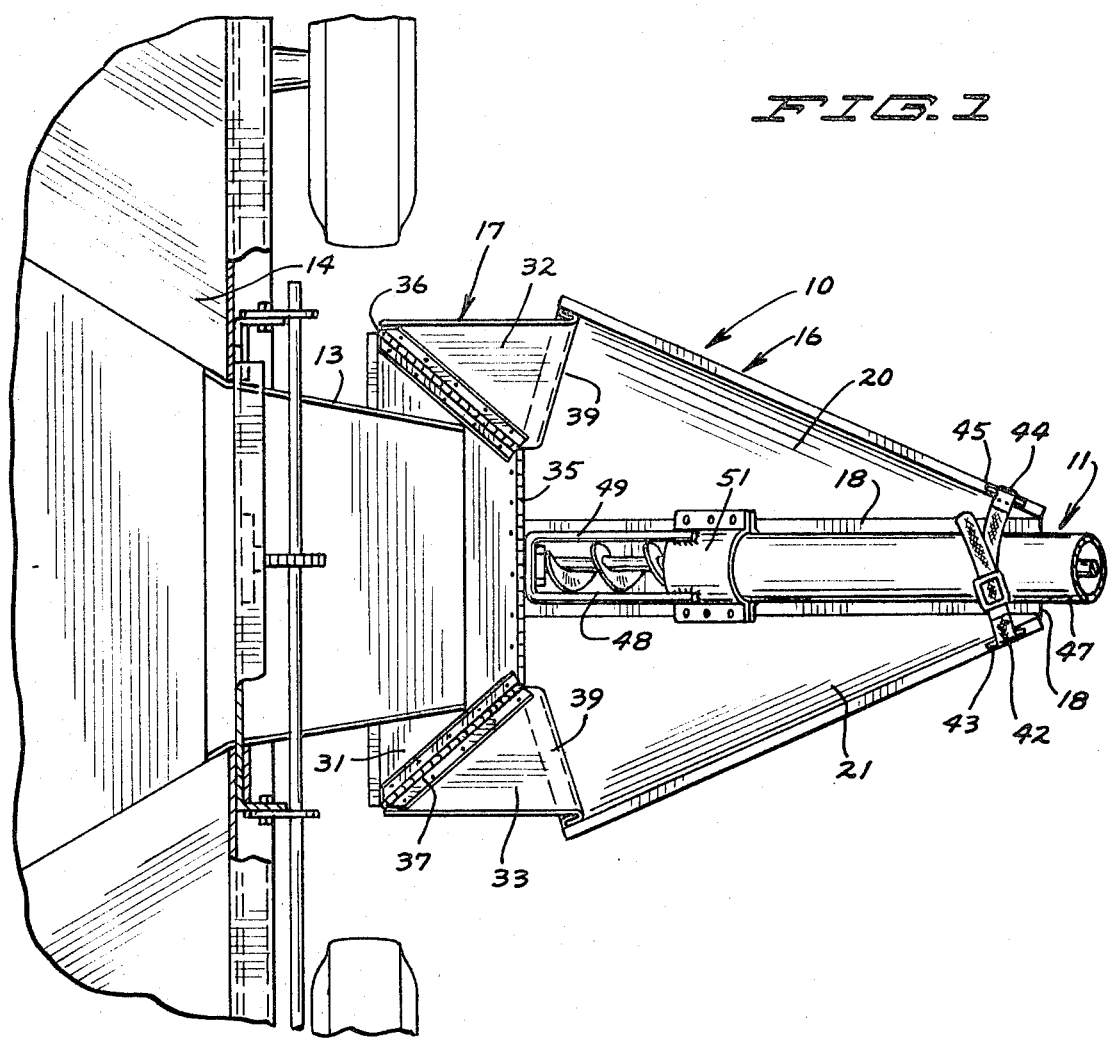
FIG. 1 is a top plan view of the auger hopper of the invention in the FIG.1; open configuration fastened to an end of a screw flight auger and in position to receive granular material from a discharge chute located on a vehicle body.
Figure 2:
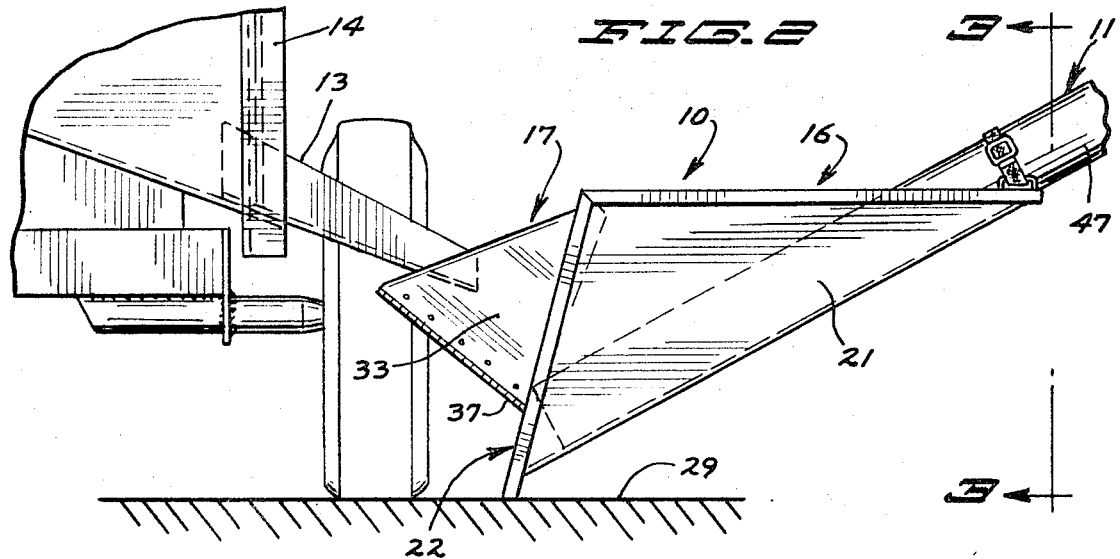
FIG. 2 is a side elevational view of the auger hopper, auger and discharge chute of FIG. 1.

In FIGS. 1 through 3 there is shown a preferred embodiment of the auger hopper of the invention, indicated generally at 10, operatively associated with an auger 11. The auger hopper 10 is positioned to receive granular material discharged through a discharge chute 13 located on a first depository station shown to be a vehicle body 14. The vehicle body 14 may be, for example, of a truck or truck trailer or like depository for storing granular material while in transport to a second depository station.

Auger hopper 10 includes a bin means or an upwardly open storage bin 16, and adjustable inlet means or mouth portion 17. Bin portion 16 temporarily stores granular material being drawn and conveyed by the auger. Mouth portion 17, in the engaged position as shown in FIGS. 1 and 2, closes a front opening of the bin 16 and serves as a mouth to deflect and guide material discharged from vehicle body 14 into the bin 16.

Bin 16 includes a generally flat elongated and, as shown in the drawings, inclined base 18. Generally triangular shaped right and left side walls 20, 21 extend from base 18, each having a rear edge extending horizontally from the uppermost or rear edge of base 18 in forward diverging relationship to one another. Forward edges of the side walls 20, 21 extend in converging relationship from the rear edges downward and inward to the front edge of base 18, defining a front opening to the bin 16. The upper rear portion of the bin 16 is open, the base 18 and rear edges of the side walls 20, 21 defining a channel or slot for accommodation of an end portion of the auger 11.

The lower portion of the front opening of the bin 16 is closed by a front wall 22 extending across said opening between the right and left side walls 20, 21 defining an interior pocket 23. As best shown by FIG. 3, the lower portion of front wall 22 extends laterally outward from either side of the front edge of base 18, as at 24, 25, forming a stand supporting the hopper relative to the ground or supporting surface 29. A pair of struts, 26, 27, extend between the legs 24, 25 and the rear juncture of the base 18 and right and left side walls 20, 21, respectively to lend rigidity and support to the structure.

The adjustable inlet means 17 of auger hopper 10 is movably mounted on the bin means 16, is selectively movable between a first out-of-the-way position outside the bin means, a second normal position fixedly engaging the bin means, closing the front opening, and a third position within the bin means. Additionally, the inlet means may be supported at any intermediate position. The inlet means 17 includes a front guiding or deflection plate 31 and right and left side plates 32, 33, respectively. Front plate 31 is generally trapezoidal in shape, having a shorter lower edge hingedly connected, as by hinge 35, to the upper edge of front wall 22. Side plates 32, 33 are generally triangular and are hingedly connected along one edge, as by hinges 36, 37 to the respective right and left edges of front plate 31.

Fastening means are provided whereby the adjustable inlet means or mouth portion 17 of the auger hopper is releasably retained in a normal upwardly open position relative to the bin portion 16, closing the front opening of the bin 16 for normal operation of the auger and auger hopper. The interior edges of the side plates 32, 33 are provided with outwardly turned J-shaped flanges 39, as shown by FIG. 5. Mating inwardly turned J-shaped flanges 40 are provided on the forward edges of the side walls 20, 21. In the fixed or open engaged configuration, as shown in FIGS. 1 and 2, these mating flanges 39, 40 interlock. Front plate 31 is retained in a generally outwardly inclined relationship to the bin portion 16, as are the side plates 32, 33 to deflect and guide discharged granular material into the bin potion 16. Mouth portion 17 is retained by gravity in the open engaged position, and is disengaged simply by movement of the front plate 31 inward, whereby the mating flanges disengage. Front plate 31, it may be seen, is selectively rotatable inwardly or outwardly on hinge 35 relative to bin portion 16. While fastening means constituted as mating flanges, as shown and described, function satisfactorily, it is understood that other usual or preferred fastening means could be employed and, if desired, such fastening means could be employed whereby the mouth portion 17 could be releasably locked at any selected angular position relative to the bin portion 16.

Means are provided for operably assembling the auger hopper 10 to an elongated tubular auger housing 47 in which auger 11 is rotatably mounted. A first strap 42 is fastened at one end to a first cleat 43 located on the upper edge of right side wall 20 near the rear of the auger hopper. A second strap 44 is fastened to a second cleat 45 disposed on the edge of left side wall 21 opposite the first cleat 43. The free end of the second strap 44 is provided with a buckle engageable with the free end of first strap 42 to secure auger housing 47 relative to the hopper. This positioning of the parts is shown in the drawings. Auger 11 extends from the auger hopper 10 through auger housing 47 to an inlet location of a second depository (not shown), such as a grain elevator. A screw-type auger flight 48 of the auger is located in the housing 47 and extends outward therefrom at the end positioned in the auger hopper. The auger is positioned in the auger housing adjacent the base 18. A suitable protective guard 49 surrounds the exposed portion of the flight 48 and is fastened to a collar 51 secured to the end of the housing 47. The exposed section of the flight 48 is located in the pocket 23 defined by front wall 22 and the lower portions of right and left side walls 20, 21.

In the use of the invention as shown in FIGS. 1 through 3, the auger and auger hopper, operatively assembled, are placed in the desired location relative, for example, to a grain elevator. Side plates 32, 33 are folded in relative to front plate 31, and mouth portion 17 is rotated inwardly or retracted into bin portion 16 as shown in section in FIG. 6. A vehicle body 14 containing the granular material to be transferred is manipulated into discharge position relative to the auger hopper 10. As the mouth section 17 of the auger hopper is in a retracted configuration, the vehicle body is moved to the required position with little likelihood of striking and damaging the hopper. Once the vehicle body is in position, mouth section 17 is extended to the fixed open configuration as shown in FIGS. 1 and 2. Flanges 39 on the side plates 32, 33 engage flanges 40 on the side walls 20, 21. A discharge chute 13 is properly positioned on the vehicle body and relative to the hopper and granular material is discharged from the vehicle body to the hopper via mouth section 17. The granular material is temporarily stored in the hopper until drawn and conveyed by the auger through the housing 47 to the inlet of a second depository station (not shown). Side walls 20, 21 and side plates 32, 33 minimize loss due to spillage.

Figure 6:
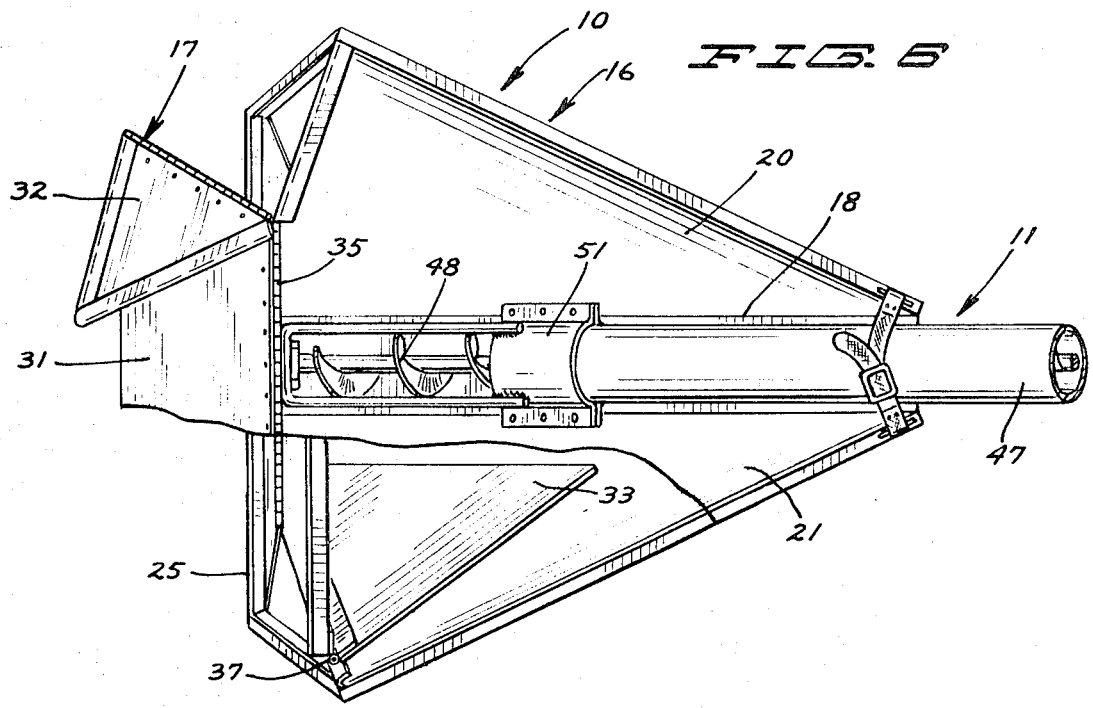
FIG. 6 is a top plan view of the auger hopper of the invention having the inlet means in a fully outwardly extended position and having a section showing the inlet means in a retracted configuration.
Figure 7:
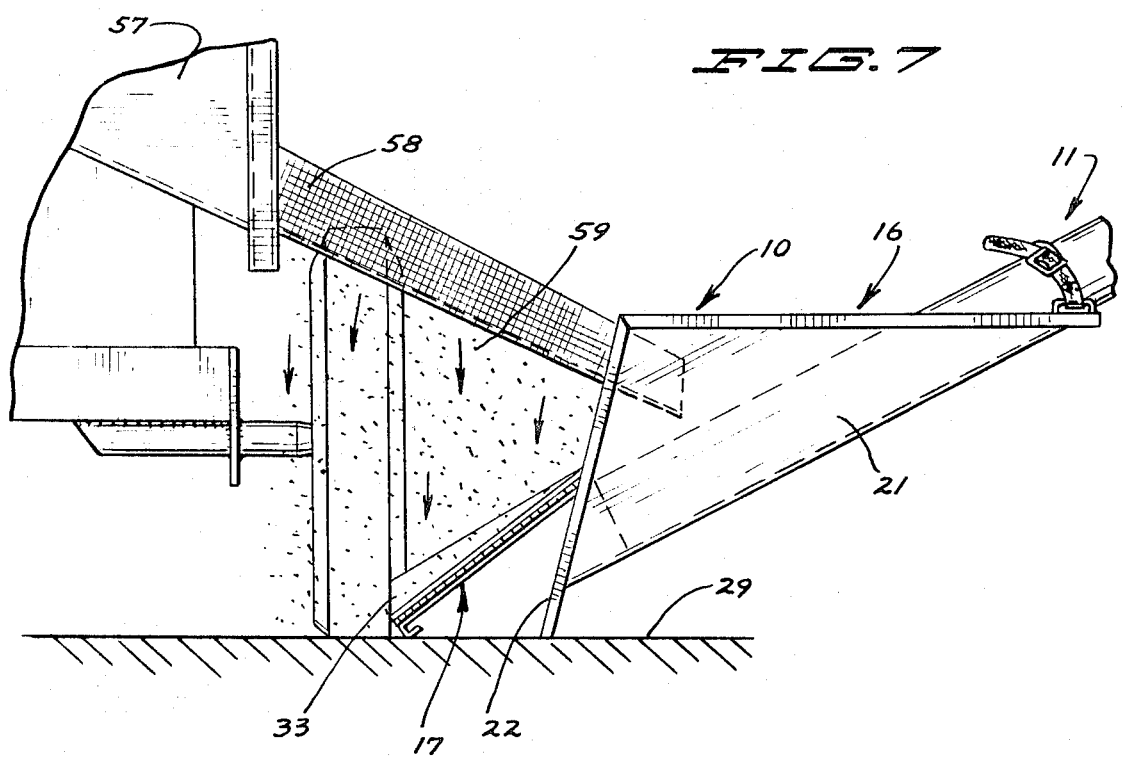
FIG. 7 is a side elevational view of the auger hopper as shown in FIG. 6 in functional relationship to a wire mesh discharge chute on a vehicle body.

The versatility of the auger hopper of the invention is further illustrated in FIGS. 4, 6 and 7. In FIG. 4, the auger hopper is shown having the mouth or inlet portion positioned closely adjacent the side of a storage body 52, such as a trailer or grain storage elevator. For example, the body 52 could be a truck trailer manipulated into closer proximity to the auger hopper than the vehicle of FIG. 2 because of the lack of a suitable discharge chute. By way of further example, the body 52 could be a grain storage elevator wherein the hopper must be located in close proximity to a discharge opening due to space limitations. Front plate 31 rests against and is supported by a wall 54 of the body 52, thereby assuming a partially open or intermediate configuration relative to the bin 16. Right side plate 32 rests against the interior of right side wall 20, and left side plate 33 rests against the interior of left side wall 21, thus defining a closed inlet opening. Granular material is discharged from the storage body 52 directly into the mouth or inlet portion 17, and thereafter operation is the same as that earlier described.

In certain operations it is desirable and sometimes necessary not to employ an auger hopper having a wide mouth or inlet. For example, during the transfer of granular material from one depository station to another, it may be desired to sift and remove from the granular material small particulate matter intermingled therewith, as small husks intermingled with wheat. A suitable method of achieving this includes the use of a discharge chute having a porous screen mesh bottom and side walls. The auger hopper of the present invention provides for such a transfer of granular material whereby separated particulate matter is not released into the auger hopper upon separation from the granular material.

Referring to FIGS. 6 and 7, there is shown the auger hopper 10 having the inlet means or mouth portion 17 in a fully outwardly extended and collapsed configuration so as to be out of the way. A vehicle 57 containing wheat or the like to be transferred to a depository location is in unloading proximity to the auger hopper 10. A discharge chute 58 extends from the vehicle 57 to a location above the bin 16 of auger hopper 10. Discharge chute 58 is fabricated with a bottom and side walls of wire mesh having a porosity fine enough to contain particles of granular material yet porous enough to allow passage of small particulate matter 59 intermingled with the granular material. For example, wheat having intermingled husks. The larger wheat kernels are contained by the discharge chute and are discharged into the bin 16. The granular material is temporarily stored in the pocket 23 of bin 16 until drawn and conveyed by the auger. The smaller husks drop through the mesh of the discharge chute 58 and fall to the ground. The inlet means 17 of the auger hopper is out of the way and does not impede the falling husks. The efficiency of the separation is thereby increased.

The embodiments of the invention in which an exclusive property or privilege is claimed are defined as follows:

1. An auger hopper having adjustable inlet means for temporarily holding of granular material being drawn and conveyed by an auger, said hopper including:

upwardly open bin means;
said bin means having a rear opening at one end for accommodation of a portion of said auger;
said bin means having a front opening at the opposite end;
said inlet means being mounted on the bin means to be movable between a first position outside the bin means, a second position closing the front opening of the bin means whereby granular material is deflected into the bin means, and a third position within the bin means; and
fastening means to releasably fasten said inlet means in the second position closing the front opening of the bin means.

2. The auger hopper of claim 1 wherein said inlet means includes: a front plate hingedly connected to the bin means; a pair of side plates hingedly connected to either side of the front plate; said side plates having a first portion of a fastening means; a second portion of fastening means disposed on the bin means; said first portion of fastening means engageable with said second portion of fastening means to releasably fasten the inlet means in the second position closing the front opening of the bin means.

3. The auger hopper of claim 2 wherein said bin means includes an inclined base and a pair of side walls extending outward and upward from at least a portion of said base, said side walls having rear edges extending from the rear of the bin means in forward diverging relationship, said side walls having forward edges extending from the rear edges in forward converging relationship to the forward portion of the bin means.

4. The auger hopper of claim 3 wherein said first portion of fastening means includes outwardly turned J-shaped flanges located on edges of said side plates, and said second portion of fastening means includes inwardly turned J-shaped flanges located on the forward edges of said side walls, said flanges on the side plates being selectively engageable with said flanges on the side walls.

5. The auger hopper of claim 4 wherein said bin means includes: a front wall extended between a portion of the forward edges of the side walls closing a lower portion of said front opening, said front wall and portions of said side walls and base defining a pocket; said front wall having a substantially horizontal upper edge, said front plate being hingedly connected to said upper edge of the front wall.

* * * * *